C. H. FOSTER.
SHOCK ABSORBING DEVICE.
APPLICATION FILED DEC. 4, 1908.
918,429.
Patented Apr. 13, 1909.
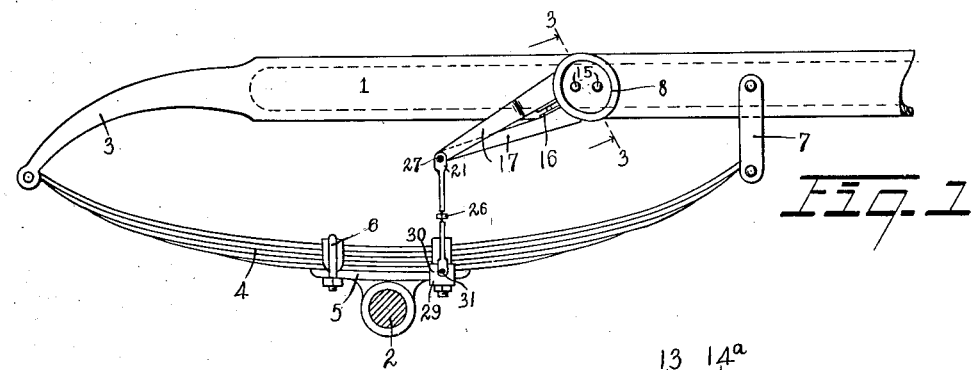
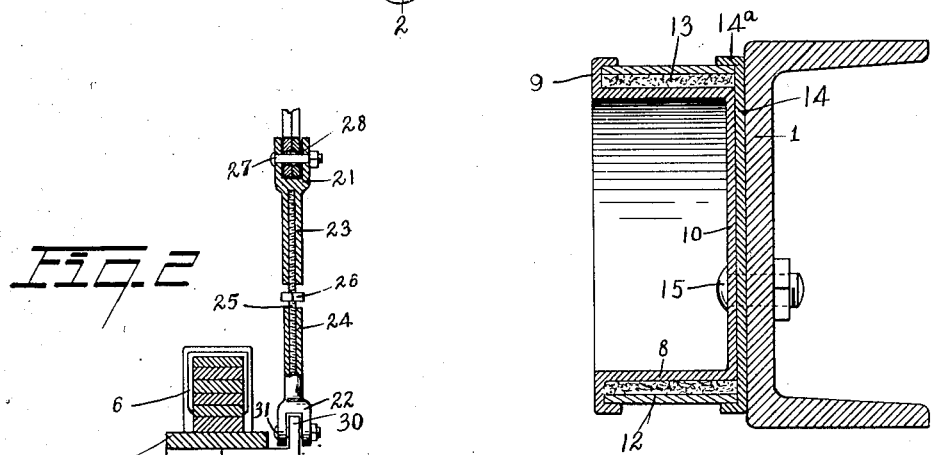
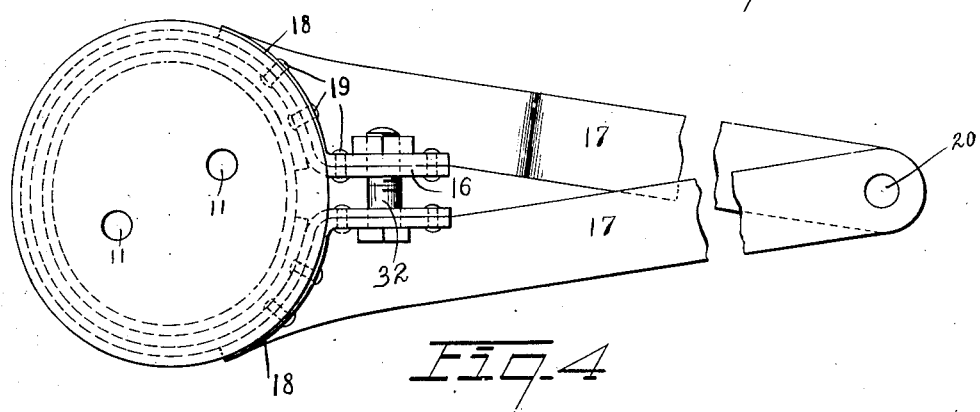
Witnesses:
Nathan F. Fretter.
Arthur S. Remsberg.
Inventor.
Claud H. Foster
By Bates, Fouts & Hull
Attys

UNITED STATES PATENT OFFICE.

CLAUD H. FOSTER, OF CLEVELAND, OHIO.

SHOCK-ABSORBING DEVICE.

No. 918,429.  Specification of Letters Patent.  Patented April 13, 1909.

Application filed December 4, 1908. Serial No. 465,988.

*To all whom it may concern:*

Be it known that I, CLAUD H. FOSTER, a citizen of the United States, residing at Cleveland, in the county of Cuyahoga and State of Ohio, have invented a certain new and useful Improvement in Shock-Absorbing Devices, of which the following is a full, clear, and exact description, reference being had to the accompanying drawings.

This invention relates to shock-absorbing devices which are interposed between the axle and frame members of vehicles for the purpose of minimizing the vibrations of the springs to prevent the breaking thereof and to secure ease of riding.

The object of the invention is, generally, to produce a device of this kind which is extremely simple of construction, convenient of application to and removal from a vehicle, which will oppose a yielding but increasing resistance to any alteration of the normal relations which exist between the axle and the frame, which can be readily adjusted to accommodate wear of parts, and which will be comparatively inexpensive of production.

With the foregoing general objects in view, my invention may be further defined as consisting of the combinations of elements illustrated, in one exemplification, in the drawings forming a part hereof and embodied in the claims hereto annexed.

Referring to the drawings, Figure 1 represents a side elevation of a portion of a vehicle frame, axle and spring, showing my invention applied thereto; Fig. 2 represents a sectional detail of a part of my shock absorber, illustrating the connections between the same and the axle and between the different parts thereof; Fig. 3 represents an enlarged sectional detail corresponding to the line 3—3 of Fig. 1; and Fig. 4 represents an enlarged elevation of the shock absorber shown in Fig. 1.

Describing the parts by reference characters, 1 and 2 denote respectively the side frame and axle members of a vehicle, the former being shown as of channel-shape in cross section. For purposes of illustration, the front axle 2 is shown, the side frame 1 being provided with a spring hanger 3, to which the front end of the spring 4 is connected. The spring 4 is secured to the axle in any suitable manner. In the drawings, it is shown as secured to the spring seat 5 by means of clips 6, the rear end of the spring being flexibly supported from the frame, as by means of swinging links 7. The preceding parts may be of any approved construction and, in their details, form no part of my invention proper.

The shock-absorber which I interpose between the frame and axle members for the purpose of reducing the vibrations and deflection of the spring comprises an elliptical base or drum 8 having applied thereto and in gripping engagement therewith a spring band, said band being discontinuous and having its adjacent spaced ends provided each with a lever arm, said arms being flexibly connected to one of the vehicle members and said base being connected to the other member. The base 8, to which reference has been made, is preferably made in the form of a cup having a flanged top 9 and a bottom 10. The bottom of the cup is provided with a suitable number of openings 11, whereby the base may be attached to one of the vehicle members, as the side frame 1.

12 denotes a spring band, the normal contour of which is the same as that of the base or drum 8. This band is preferably of steel and is sufficiently larger than its coöperating base to receive therebetween a lining 13 of friction material, such material being conveniently made of belting. When applied to the base 8, the spring 12 and the lining 13 are prevented from moving in one direction beyond the base by the flange 9. A plate 14, the outer periphery whereof is substantially the same as the outer periphery of flange 9, is applied to the bottom 10 of the base and, with the flange 9, retains the lining or packing 13, and the spring band 12 in proper relation to the base or drum 8. The plate 14 will be provided with apertures adapted to register with apertures 11 and to receive bolts 15, by means of which the base may be secured to the appropriate vehicle member. In the drawings, the base is shown as secured to one of the side frames 1.

It will be noted that, when the base or drum is secured to the side frame, the arrangement of the apertures 11 is such that they occupy the central portion of the web of the channel iron, thereby preventing the frame from being materially weakened by the apertures formed therein for the accommodation of the bolts 15. It will be noted also that the flanges 9 and 14ª which are provided respectively on the top of the base or drum 8 and on the plate 14 are bent so as to cover the joints between such flanges and the adjacent edges of the spring band; thereby protecting the lining or packing 13 from mud.

As previously stated, the spring 12 is discontinuous, having its ends provided each with an outstanding flange 16, said flanges projecting in the direction of the minor axis of the elliptical base.

17 denotes lever arms which are carried by the spring 12. Each of these arms is preferably formed integral with a curved attaching member 18 which conforms in contour to that portion of the base 8 which is adjacent to the flange 16, and also to the contour of said flange, as shown more particularly in Fig. 4. Referring to the flanged end of the base or drum 8 as the "top" and to the opposite end as the "bottom", for convenience of description, each member 18 has formed with the top thereof an integral flange which is extended to form one of the lever arms 17. A similar member 18 is provided at the opposite side of the opening between the ends of the spring 12 and each of the members 18 is secured to the spring by means of rivets 19 which connect the curved and flanged portions thereof with the corresponding parts of spring 12. In practice, one of the lever arms will be offset to enable the outer ends of the arms to overlap, in the manner shown in Figs. 1 and 4 without bending or distorting the arms and each arm will be provided at its outer end with an aperture 20 for the reception of a flexible connection extending to the other vehicle member.

The flexible connection illustrated herein consists of a link comprising a pair of yokes 21 and 22, each having an internally threaded sleeve or extension 23 and 24 respectively, said sleeves being reversely threaded and being connected by means of a bolt 25 having its opposite ends reversely threaded and provided with a nut 26 rigid therewith for the purposes of adjustment. It will be apparent that, by rotating the bolt 25, the yokes 21 and 22 may be brought closer together or moved farther apart, according to the requirements of the particular vehicle to which the absorber is applied. Yoke 21 is connected to the ends of levers 17 by means of a bolt 27 extending through said yoke and through the apertures 20 in the lever ends, said bolt extending through a bushing 28 which is applied between the arms of the yoke. The yoke 22 is connected in any suitable manner to the axle. As shown in the drawings, this connection may be conveniently made by means of a plate 29 which is applied to one of the spring clips 6 beneath the bottom of the spring seat 5, plate 29 having an upturned end 30 provided with an aperture for the reception of a bolt 31 which extends through such upturned end and through the yoke 22. It will be seen that the two yokes and the bolt 25 comprise an adjustable link connection between the ends of the levers 17 and the vehicle axle.

In applying my shock absorber to a vehicle, the parts should be so adjusted that when the spring is in its normal position,—that is to say, when subjected to ordinary load without any sudden deflection caused by encountering obstacles,—the point at which the ends of the arms 17 are connected with the axle should be substantially along the line of the minor axis of the ellipse of the base or drum 8, and the base will be applied to the side frame in such manner as to secure this result. As shown in Fig. 1, this result may be secured by having the arms 17 project downwardly into the space between the side frame and the axle and extending in the direction described. It will be apparent that, on encountering any obstacle causing the axle and frame to approach each other, the arms 17 will be moved upwardly. This movement, however, owing to the gripping engagement between the spring 12 and the base 8, is yieldingly and increasingly resisted by said spring rotating on the said base 8. The fact that 12 is made of spring metal enables it to accommodate itself to the change in shape imposed upon it by the elliptical shape of the base, but this change will be increasingly resisted by the spring and the friction material interposed between the same and the base. In similar manner, a rebound, causing a separation of the axle and side frame, will cause the arms 17 to be moved downwardly against the yielding and increasing resistance between the spring 12 and the base 8, this action being enhanced by the presence of the friction material 13.

Among the advantages of my invention are its simplicity of construction, its convenience of application to and removal from a vehicle, its durability, and its adaptability to the various incidents of service. Furthermore, as the spring flanges 16 are connected by a bolt 32, the gripping engagement of the spring and the base or drum may be adjusted to compensate for wear and to accommodate the device to different loads.

Having thus described my invention, what I claim is:

1. In a shock absorber, the combination of an elliptical base, a yielding metallic member surrounding said base and rotatable thereon, and friction material interposed between said member and said base.

2. In a shock absorber, the combination of an elliptical base member, a yielding member surrounding said base member and arranged to grip the same, and operating means for one of said members whereby it may be rotated relatively to the other member.

3. In a shock absorber, the combination of an elliptical base having means whereby it may be attached to a vehicle member, a discontinuous yielding member surrounding said base and having each end provided with an arm, and friction material interposed between said member and said base, and gripped therebetween.

4. A shock absorber for vehicles comprising, in combination, a base member and a yielding member of corresponding contour applied to the said base member and arranged to grip said base member, one of said members having means whereby it may be rotated relatively to the other and said base member being noncircular in shape to oppose an increasing resistance to relative movement between itself and the yielding member.

5. A shock absorber for vehicles comprising, in combination, a base member and a yielding member applied to the base member and arranged to grip said base member, one of said members having means whereby it may be rotated relatively to the other and said base member being noncircular in shape to oppose relative movement between itself and the yielding member.

6. The combination, with axle and frame members of a vehicle, of a shock absorber comprising a base member adapted to be applied to one of said members, a yielding member adapted to be connected to the other vehicle member, one of said absorber members surrounding the other and the yielding member being discontinuous and having each end thereof provided with an arm, the base member being noncircular in shape to oppose resistance to the rotary movement of the yielding member with respect thereto.

7. A shock absorber comprising in combination a base member and a yielding member, one of said members extending around the other and said members being arranged to grip each other, and an operating arm connected with one of said members, the base member being noncircular in shape to produce with the yielding member an increasing resistance to relative rotary movement between said members.

8. A shock absorber comprising in combination a base member and a yielding member, said members being sleeved one upon the other and being each adapted for connection to a vehicle member, and friction material interposed between said absorber members, the base member being noncircular in shape to produce with the yielding member and the friction material and increasing resistance to relative rotary movement between said absorber members.

9. A shock absorber for vehicles comprising an elliptical base provided with a flange at one end thereof, a yielding spring member rotatably mounted on said base and adapted to grip the same and having ends spaced apart, an arm projecting from each of said ends, and means coöperating with the other end of said base for retaining the yielding member thereon.

10. A shock absorber for vehicles comprising an elliptical base, a yielding spring member rotatably mounted on said base and having ends spaced apart, an arm projecting from said spring member, and a bolt connecting said ends of the spring member.

11. The combination, with the frame and axle members of a vehicle, of a shock absorber comprising an elliptical base secured to one of said members, a discontinuous sleeve of yielding material mounted on said base and adapted to grip the same and having at each end thereof an arm, and a flexible member operatively connected to the other vehicle member and to said arms.

12. The combination, with the frame and axle members of a vehicle, of a shock absorber interposed therebetween and comprising an elliptical base connected to one of said members, an elliptical spring member having its ends separated and sleeved on said base and adapted to grip the same, arms projecting from the ends of the spring member, means for retaining said spring on said base, and a flexible connection between said arms and the other vehicle member.

13. The combination, with the frame and axle members of a vehicle, of a shock-absorbing device comprising an elliptical base applied to one of the said members, an elliptical sleeve of yielding material mounted on said base, said sleeve being discontinuous and having its ends in proximity and each provided with an outwardly projecting lever arm, and a flexible connection between the said arms and the other vehicle member.

14. A shock absorber device comprising a member of elliptical contour and a yielding member of similar contour, one of said members being sleeved upon the other and adapted to grip the same, an operating arm projecting from one of said members whereby it may be rotated with respect to the other member, and the yielding member having its ends separated to permit it to accommodate itself to the other member during relative rotary movement between said members.

15. A shock absorber for vehicles comprising an elliptical base member, a yielding spring member arranged to grip said base member and having its ends spaced apart, an arm projecting from one of said members, and means whereby the ends of the yielding member may be adjusted.

16. A shock absorber device comprising in combination an elliptical base member and a yielding member sleeved one upon the other and in gripping relation to each other, means whereby one of said members may be rotated with respect to the other, and means whereby the engagement between said members may be adjusted.

In testimony whereof, I hereunto affix my signature in the presence of two witnesses.

CLAUD H. FOSTER.

Witnesses:
J. B. HULL,
J. D. COSTLAW.